United States Patent
Park et al.

(10) Patent No.: US 9,626,009 B2
(45) Date of Patent: Apr. 18, 2017

(54) COORDINATE INDICATING DEVICE AND COORDINATE MEASURING DEVICE FOR MEASURING INPUT COORDINATES OF COORDINATE INDICATING DEVICE

(71) Applicant: Samsung Electronics Co., Ltd., Gyeonggi-do (KR)

(72) Inventors: Jin-Hyoung Park, Gangwon-do (KR); Yu-Dong Bae, Gyeonggi-do (KR); Eun-Hwa Lee, Gyeonggi-do (KR); Dae-Kwang Jung, Gyeonggi-do (KR); Ji-Hoon Jung, Seoul (KR)

(73) Assignee: Samsung Electronics Co., Ltd (KR)

( * ) Notice: Subject to any disclaimer, the term of this patent is extended or adjusted under 35 U.S.C. 154(b) by 80 days.

(21) Appl. No.: 13/908,535

(22) Filed: Jun. 3, 2013

(65) Prior Publication Data
US 2013/0321358 A1 Dec. 5, 2013

(30) Foreign Application Priority Data
Jun. 4, 2012 (KR) .......................... 10-2012-0059817

(51) Int. Cl.
*G06F 3/033* (2013.01)
*G06F 3/0354* (2013.01)
*G06F 3/01* (2006.01)

(52) U.S. Cl.
CPC .......... *G06F 3/03545* (2013.01); *G06F 3/016* (2013.01); *G06F 2200/1632* (2013.01)

(58) Field of Classification Search
CPC ................ G06F 3/016; G06F 3/03545; G06F 2200/1632

USPC ........................................................ 345/179
See application file for complete search history.

(56) References Cited

U.S. PATENT DOCUMENTS

| | | | |
|---|---|---|---|
| 5,136,125 A * | 8/1992 | Russell ...................... | 178/18.07 |
| 5,767,759 A * | 6/1998 | Rouet .......................... | 336/174 |
| 2002/0033561 A1* | 3/2002 | Kawaguchi .......... | C08K 3/0008 |
| | | | 264/500 |
| 2005/0063570 A1* | 3/2005 | Kim .................. | G07C 9/00063 |
| | | | 382/119 |
| 2008/0150918 A1* | 6/2008 | Hagen et al. ................ | 345/179 |

(Continued)

FOREIGN PATENT DOCUMENTS

| KR | 10-0769981 | 10/2007 |
|---|---|---|
| KR | 100942704 | 2/2010 |

(Continued)

*Primary Examiner* — Jonathan Blancha
(74) *Attorney, Agent, or Firm* — The Farrell Law Firm, P.C.

(57) ABSTRACT

A coordinate indicating device which inputs coordinates to a coordinate measuring device is provided. The coordinate indicating device includes a power receiver for wirelessly receiving drive power from the coordinate measuring device, a rectifier for rectifying the wirelessly received drive power into Direct Current (DC) drive power, a battery for storing the rectified drive power, an actuator for outputting at least one of preset vibration, frictional force, and electrostatic force, based on relative positions of the coordinate measuring device and the coordinate indicating device by using the rectified drive power provided from the battery, a coordinate indicator for indicating coordinates at predetermined coordinates on the coordinate measuring device, and a shielding portion for shielding the coordinate indicator.

9 Claims, 6 Drawing Sheets

(56) References Cited

U.S. PATENT DOCUMENTS

| | | | |
|---|---|---|---|
| 2008/0221642 A1* | 9/2008 | Humayun et al. ............... 607/58 |
| 2009/0135164 A1 | 5/2009 | Kyung et al. |
| 2009/0267558 A1* | 10/2009 | Jung ....................... H02J 5/005 |
| | | | 320/108 |
| 2011/0096002 A1* | 4/2011 | Koh et al. ...................... 345/173 |
| 2011/0164000 A1* | 7/2011 | Pance ................. G06F 3/03545 |
| | | | 345/179 |
| 2012/0146958 A1* | 6/2012 | Oda .................... G06F 3/03545 |
| | | | 345/179 |
| 2012/0235636 A1* | 9/2012 | Partovi ................... H02J 7/025 |
| | | | 320/108 |
| 2013/0002191 A1 | 1/2013 | Jung et al. |

FOREIGN PATENT DOCUMENTS

| | | | |
|---|---|---|---|
| KR | 1020110103368 | 9/2011 |
| WO | WO 2011/112064 A2 * | 9/2011 | .............. H02J 17/00 |

\* cited by examiner

COORDINATE INDICATING DEVICE AND COORDINATE MEASURING DEVICE FOR MEASURING INPUT COORDINATES OF COORDINATE INDICATING DEVICE

PRIORITY

This application claims priority under 35 U.S.C. §119(a) to a Korean Patent Application filed in the Korean Intellectual Property Office on Jun. 4, 2012 and assigned Serial No. 10-2012-0059817, the entire disclosure of which is incorporated herein by reference.

BACKGROUND OF THE INVENTION

1. Field of the Invention

The present invention generally relates to a coordinate indicating device and a coordinate measuring device for measuring input coordinates of the coordinate indicating device, and more particularly, to a coordinate indicating device which wirelessly receives drive power wirelessly transmitted by a coordinate measuring device.

2. Description of the Related Art

With the recent dramatic growth of the market associated with smart phones and touch screens, related research has also been actively conducted. To input a specific command in association with a smart phone or a touch screen, a user may input a specific command or designate a specific icon by placing a part of a user's body or a stylus pen in a specific position on a display.

As one of the input schemes of the stylus pen, an Electromagnetic Resonance (EMR) scheme is widely used. In the EMR scheme, a loop coil is disposed on a Printed Circuit Board (PCB), a voltage is applied to the loop coil to generate electromagnetic waves, and the generated electromagnetic waves are absorbed by an EMR pen. Herein, the EMR pen may include a condenser and a loop, and may emit the absorbed electromagnetic waves in a predetermined frequency.

The electromagnetic waves emitted from the EMR pen may be absorbed again into the loop coil of the PCB so that a position of a touch screen near the EMR pen may be determined based on the absorbed electromagnetic waves.

Power transmission based on electromagnetic induction transmits power between a primary coil and a secondary coil. Once a magnet moves in a coil, an induced current is generated and by using the induced current, a transmission side generates a magnetic field and a reception side induces a current according to a change of the magnetic field, thus producing energy. Such a phenomenon is called a magnetic induction phenomenon and a power transmission method using this phenomenon transmits energy very efficiently.

In regard to the resonance scheme, Soljacic, a professor at the Massachusetts Institute of Technology (MIT), announced in 2005 a system in which electricity is wirelessly transferred using a resonance-based power transmission principle, based on a coupled mode theory that operates even when a device to be charged is separated from a charging device by several meters. The wireless charging system used by the MIT team employed the concept in physics of resonance by which, when a tuning fork oscillates at a particular frequency, a wine glass next to the tuning fork will tend to oscillate at the same frequency. The research team resonated an electromagnetic wave containing electrical energy instead of resonating sounds. The resonated electrical energy is directly transferred only when there is a device having a resonance frequency, and parts of electrical energy that are not used are reabsorbed into an electromagnetic field instead of being spread in the air, so that the electrical energy does not affect surrounding machines or people, in contrast to other electromagnetic waves.

The electric field coupling method transmits and receives power through coupling between electric fields generated in terminals of the transmission side and the reception side. The electric field coupling method is advantageous in that the degree of freedom of a horizontal position and the height of the degree of freedom of electrode designing may be flexibly adjusted.

A recently developed stylus pen provides a frictional force or vibration to the user to allow the user to experience an environment similar to an actual writing environment of a writing tool. For example, the stylus pen provides a frictional force to the user so that the user may experience the same effect as when the user actually writes on paper using a pencil.

For the foregoing structure, the stylus pen may include a means for providing vibration or a frictional force, such as an actuator. Moreover, the stylus pen includes a battery for storing power necessary for the overall operation of the actuator and the overall operation of the stylus pen. Herein, the battery of the stylus pen may be rechargeable or non-rechargeable. If the battery is non-rechargeable, it needs to be replaced when the battery is discharged. For the rechargeable battery, an external power source for charging is required, causing inconvenience to the user.

Therefore, a need exists to develop a technique for providing power necessary for the stylus pen based on user convenience.

SUMMARY OF THE INVENTION

The present invention has been made to address at least the problems and disadvantages described above, and to provide at least the advantages described below.

Accordingly, aspects of the present invention provide a coordinate indicating device for wirelessly receiving drive power from a coordinate measuring device, and provide the coordinate measuring device for wirelessly transmitting drive power to the coordinate indicating device.

According to an aspect of the present invention, there is provided a coordinate indicating device for inputting coordinates to a coordinate measuring device. The coordinate indicating device includes a power receiver for wirelessly receiving drive power from the coordinate measuring device, a rectifier for rectifying the wirelessly received drive power into Direct Current (DC) drive power, a battery for storing the rectified drive power, an actuator for outputting at least one of preset vibration, frictional force, and electrostatic force, based on relative positions of the coordinate measuring device and the coordinate indicating device by using the rectified drive power provided from the battery, a coordinate indicator for indicating coordinates at predetermined coordinates of the coordinate measuring device, and a shielding portion for shielding the coordinate indicator.

According to another aspect of the present invention, there is provided a coordinate measuring device for measuring an input point of a coordinate indicating device. The coordinate measuring device includes a battery for storing drive power required for driving the coordinate measuring device, an inverter for inverting the drive power output from the battery for output to the coordinate indicating device, a power transmitter for wirelessly transmitting the inverted drive power to the coordinate indicating device, and a coordinate measurer for determining the input point based on a signal that is input from the coordinate indicating device.

BRIEF DESCRIPTION OF THE DRAWINGS

The above and other features and advantages of embodiments of the present invention will be more apparent from the following detailed description taken in conjunction with the accompanying drawings, in which.

Throughout the drawings, like reference numerals will be understood to refer to like parts, components, and structures.

DETAILED DESCRIPTION OF EMBODIMENTS OF THE PRESENT INVENTION

The following description with reference to the accompanying drawings is provided to assist in a comprehensive understanding of embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to their dictionary meanings, but, are merely used to enable a clear and consistent understanding of the invention. Accordingly, it should be apparent to those skilled in the art that the following description of embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
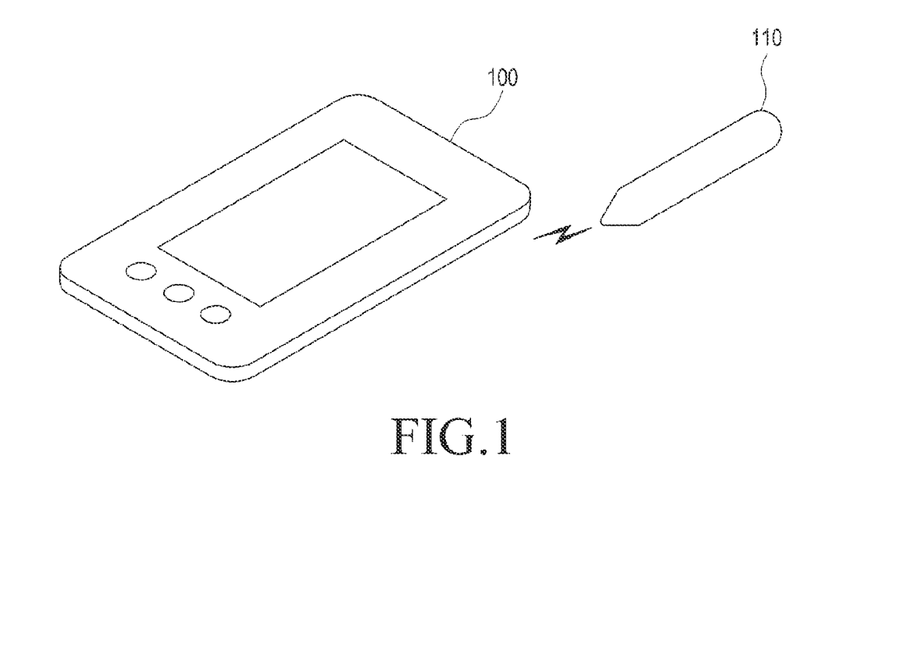
FIG. 1 is a conceptual diagram illustrating a coordinate measuring device and a coordinate indicating device according to an embodiment of the present invention.

FIG. 1 is a conceptual diagram illustrating a coordinate measuring device and a coordinate indicating device according to an embodiment of the present invention.

As illustrated in FIG. 1, the coordinate measuring system includes a coordinate measuring device 100 and a coordinate indicating device 110.

The coordinate measuring device 100 measures an input position of the coordinate indicating device 110. The coordinate measuring device 100 measures the input position of the coordinate indicating device 110 based on, for example, an Electromagnetic Resonance (EMR) scheme.

Herein, the coordinate measuring device 100 includes a coordinate measuring module for measuring the input position of the coordinate indicating device 110. The coordinate measuring device 100 may be a device capable of processing or transmitting and receiving a predetermined communication packet, and may be implemented with, for example, a cellular phone, a Personal Digital Assistant (PDA), a Portable Multimedia Player (PMP), a smart phone, a tablet Personal Computer (PC), or the like.

The coordinate indicating device 110 may be implemented in the form of a stylus pen. The coordinate indicating device 110 designates a specific position of the coordinate measuring device 100. For example, the user brings a pen tip of the coordinate indicating device 110, such as a stylus pen, into contact with a particular point on the coordinate measuring device 100, thus designating the input position. The coordinate indicating device 100 designates the particular point of the coordinate measuring device 100 based on, for example, the EMR scheme. In this case, the coordinate indicating device 110 outputs predetermined electromagnetic waves.

The coordinate indicating device 110 provides a predetermined frictional force or predetermined vibration to the user. The user writes on the coordinate measuring device 100 using the coordinate indicating device 110, and in this process, the user may be provided with actual writing sensation based on a frictional force or vibration provided from the coordinate indicating device 110.

The coordinate indicating device 110 wirelessly receives drive power required for an actuator's operation from the coordinate measuring device 100. The coordinate indicating device 110 wirelessly receives drive power based on one of an induction scheme, a resonance scheme, and an electric field (E-field) coupling scheme.

As discussed above, the coordinate indicating device 110 wirelessly receives drive power from the coordinate measuring device 100. Thus, the coordinate indicating device 110 receives drive power if it exists within a preset range of the coordinate measuring device 100, such that replacement of a battery or contact charging using an external power source may not be required. The coordinate indicating device 110 wirelessly receives drive power from the coordinate measuring device 100 during a preset period. For example, the user may control transmission/non-transmission of drive power by manipulating the coordinate measuring device 100. Based on the user's manipulation, the coordinate indicating device 110 receives drive power during the preset period, thus preventing unnecessary consumption of drive power.

In FIG. 1, drive power is wirelessly received when the coordinate indicating device 110 is positioned near the coordinate measuring device 100. However, this illustration is merely an example and the coordinate measuring device 100 may include a cradle portion for the coordinate indicating device 110 in which the efficiency of transmission/reception of drive power is maximized. The user places the coordinate indicating device 110 on the cradle portion, and in this case, the efficiency of wireless transmission/reception of drive power is maximized.

Figure 2:
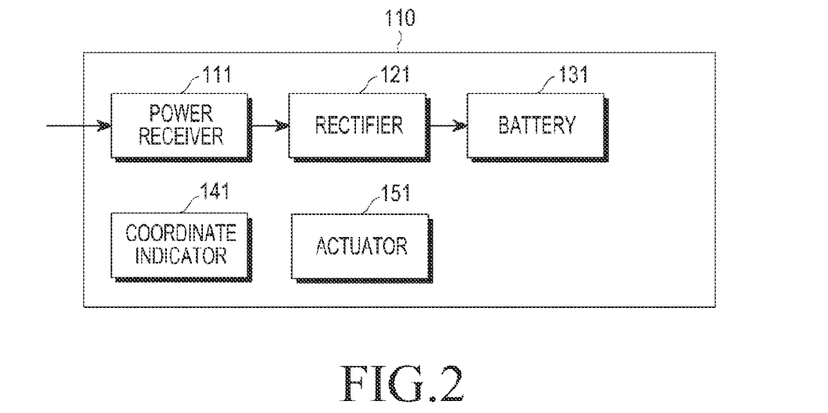
FIG. 2 is a block diagram illustrating a coordinate indicating device according to an embodiment of the present invention.

FIG. 2 is a block diagram illustrating the coordinate indicating device 110 according to an embodiment of the present invention.

As illustrated in FIG. 2, the coordinate indicating device 110 includes a power receiver 111, a rectifier 121, a battery 131, a coordinate indicator 141, and an actuator 151.

The power receiver 111 wirelessly receives drive power from the coordinate measuring device 100. The power receiver 111 wirelessly receives drive power based on one of the induction scheme, the resonance scheme and the E-field coupling scheme. The power receiver 111 may be implemented with, for example, a loop coil having a predetermined inductance.

The rectifier 121 rectifies received drive power. The drive power received from the power receiver 111 may have an Alternating Current (AC) waveform, and the rectifier 121 rectifies the drive power of the AC waveform into drive power of a Direct Current (DC) waveform which is available to the coordinate indicating device 110. The rectifier 121 rectifies the received drive power into the drive power of the DC waveform at a voltage which is suitable to be used by the coordinate indicating device 110. The coordinate indicating device 110 may further include a DC/DC converting means (not illustrated) as well as the power receiver 111, and converts the drive power of the DC waveform output from the rectifier 121 into the drive power of the DC waveform of a voltage which is suitable to be used by the coordinate indicating device 110.

The battery 131 stores the rectified drive power which is output from the rectifier 121. The battery 131 outputs the drive power necessary for operations of the coordinate indicating device 110.

The coordinate indicator 141 designates a particular point of the coordinate measuring device 100. For example, the coordinate indicator 141 may designate a particular point of the coordinate measuring device 100 based on the EMR scheme, and in this case, the coordinate indicator 141 includes at least one of at least one coil and at least one passive element. More specifically, the coordinate indicator 141 includes one coil and a resonance circuit including a capacitor connected to the coil. The coordinate indicator 141 outputs electromagnetic waves of a preset resonance frequency based on drive power that is input from the battery 131. The coordinate measuring device 100 determines an input position of the coordinate indicating device 110 based on the electromagnetic waves that are input from the coordinate indicator 141. A structure in which the coordinate measuring device 100 determines the input position of the coordinate indicating device 110 will be described later in more detail.

The actuator 151 outputs a frictional force or vibration based on a positional relationship between the coordinate indicating device 110 and the coordinate measuring device 100. The actuator 151 may include at least one of a vibration motor, a linear motor, and piezo-electric material and Electro-Active Polymer (EAP).

The actuator 151 provides an electrostatic force, and/or a frictional force and/or vibration, to a user-holding portion. The actuator 151 adjusts and outputs the strength of the frictional force, vibration, or the electrostatic force according to a writing pressure of the coordinate indicating device 110. The actuator 151 outputs the frictional force, vibration, or the electrostatic force in a form which serves user experience.

The coordinate indicating device 110 adjusts the output of the actuator 151 for itself or based on an input signal from the coordinate measuring device 100.

When the coordinate indicating device 110 adjusts the output of the actuator 151 for itself, the coordinate indicating device 110 includes a storing means (not illustrated) for storing a lookup table regarding a positional relationship between the coordinate indicating device 110 and the coordinate measuring device 100, and a corresponding relationship with the actuator 151. For example, the storing means stores a lookup table regarding a relationship between a writing pressure of the coordinate indicating device 110 and a corresponding output frictional force of the actuator 151. The coordinate indicating device 110 reads the lookup table and controls the actuator 151 to output a frictional force corresponding to a writing pressure.

When the coordinate indicating device 110 adjusts the output of the actuator 151 based on an input signal from the coordinate measuring device 100, the coordinate measuring device 100 includes a storing means (not illustrated) for storing a lookup table regarding a positional relationship between the coordinate indicating device 110 and the coordinate measuring device 100, and a corresponding relationship with the actuator 151. For example, the storing means stores a lookup table regarding a relationship between a writing pressure of the coordinate indicating device 110 and a corresponding output frictional force of the actuator 151. The coordinate measuring device 100 reads the lookup table and outputs a control signal for controlling the actuator 151 to output a frictional force corresponding to a writing pressure to the coordinate indicating device 110. The coordinate indicating device 110 controls the actuator 151 based the input control signal.

Although not illustrated, the coordinate indicating device 110 may further include a shielding material. Herein, the shielding material shields the coordinate indicator 141 from the other components.

Figure 3:
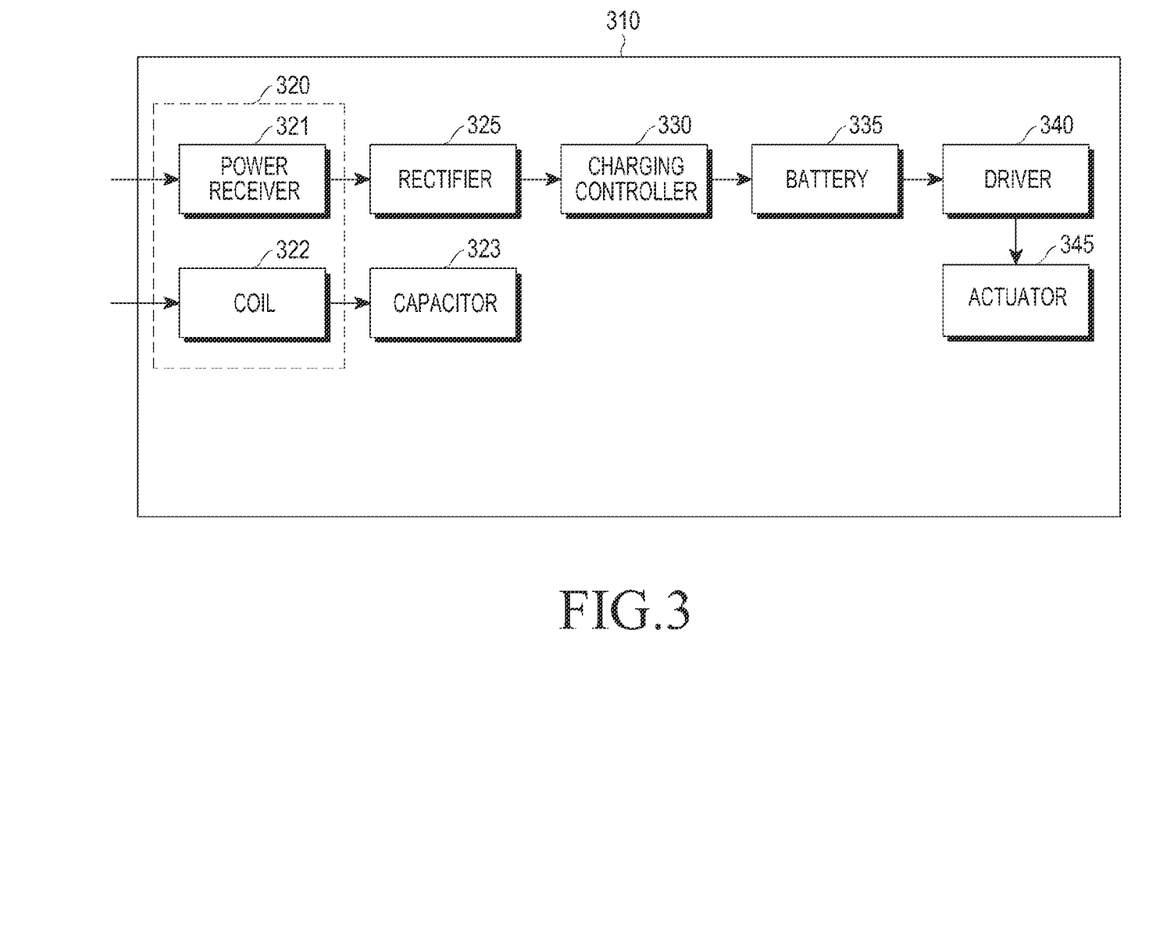
FIG. 3 is a block diagram illustrating a coordinate indicating device according to another embodiment of the present invention.

FIG. 3 is a block diagram illustrating a coordinate indicating device 310 according to another embodiment of the present invention.

Referring to FIG. 3, the coordinate indicating device 310 includes a power receiver 321, a coil 322, a capacitor 323, a rectifier 325, a charging controller 330, a battery 335, a driver 340, and an actuator 345. Herein, the power receiver 321, the rectifier 325, the battery 335, and the actuator 345 may have the same structures as the power receiver 111, the rectifier 121, the battery 131, and the actuator 151 illustrated in FIG. 2, and thus will not be described any further.

The charging controller 330 controls drive power provided to the battery 335. For example, as the battery 335 approaches a fully-charged state, drive power provided to the battery 335 may be reduced. When the battery 335 is in a fully-charged state, the charging controller 330 control the drive power so as to not be provided to the battery 335. The charging controller 330 may include, for example, an element capable of adjusting impedance, and by adjusting the element's impedance, adjusts the drive power provided to the battery 335.

The driver 340 outputs a drive signal for driving the actuator 345 to the actuator 345. As stated previously, the actuator 345 may output vibration, the frictional force, or the electrostatic force in various ways according to the positional relationship between the coordinate indicating device 310 and the coordinate measuring device 100. The driver 340 generates and outputs a drive signal based on the lookup table regarding the positional relationship between the coordinate indicating device 310 and the coordinate measuring device 100 and the corresponding relationship with the actuator 151, which is described in detail with reference to FIG. 2.

The coil 322 and the capacitor 323 receive drive power from the battery 335 and output an electromagnetic field of a preset resonance frequency.

The power receiver 321 and the coil 322 are illustrated in FIG. 3 as being implemented with different hardware, but they may also be implemented with one coil.

Figure 4:
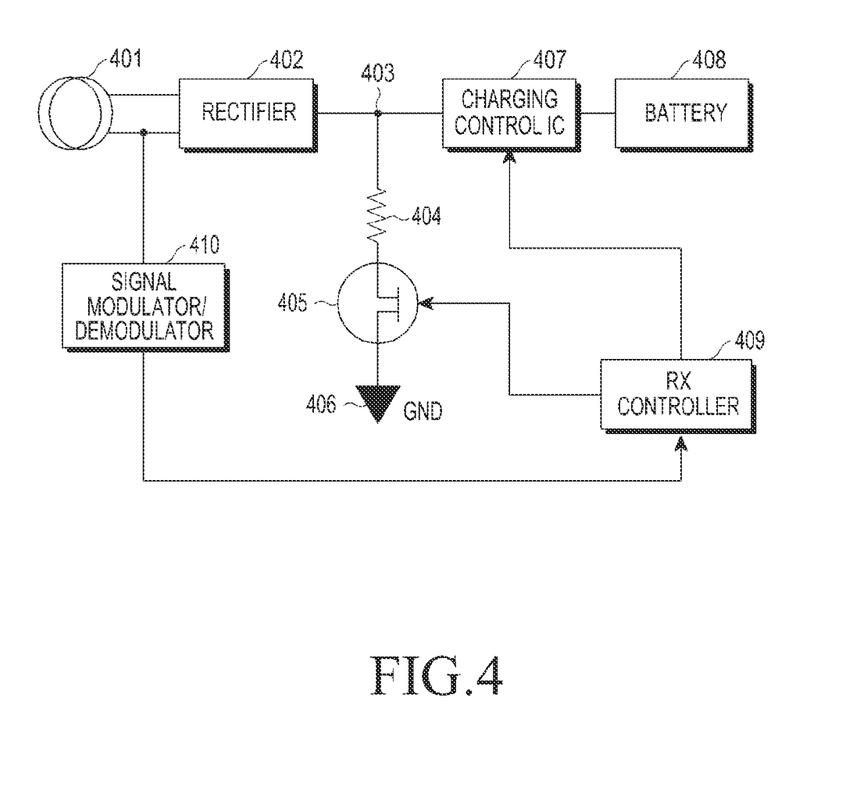
FIG. 4 is a circuit diagram illustrating a coordinate indicating device according to another embodiment of the present invention.

FIG. 4 is a circuit diagram illustrating a coordinate indicating device according to another embodiment of the present invention.

Referring to FIG. 4, the coordinate indicating device includes a coil 401, a rectifier 402, a resistor 404, a Metal Oxide Semiconductor Field Effect Transistor (MOSFET) element 405, a ground 406, a charging control Integrated Circuit (IC) 407, a battery 408, a reception (Rx) controller 409, and a signal modulator/demodulator 410.

The coil 401 wirelessly receives drive power from the coordinate measuring device 100. Moreover, the coil 401 outputs an Rx signal, which is modulated by the signal modulator/demodulator 410 from an Rx signal input from the Rx controller 409, to the coordinate measuring device 100. The coil 401 receives a signal input from the coordinate measuring device 100, for example, an actuator control signal.

The coil 401 is wound at least once, and inputs and outputs electromagnetic waves of a particular frequency. The coil 401 may also input or output electromagnetic waves of multiple frequencies instead of single frequency.

The coil 401 is connected to the rectifier 402 and the signal modulator/demodulator 410. The rectifier 402 rectifies wirelessly received drive power. The rectifier 402 is connected to the node 403. The node 403 is connected to one end of the resistor 404 and to one end of the charging control IC 407. The other end of the resistor 404 is connected to a source stage of the MOSFET element 405. A drain stage of the MOSFET element 405 is connected to the ground 406. A gate stage of the MOSFET element 405 is connected to the Rx controller 409.

The signal modulator/demodulator 410 is connected to the Rx controller 409. The Rx controller 409 is connected to the charging control IC 407. The charging control IC 407 is connected to the battery 408.

The charging control IC 407 controls drive power supplied to the battery 408.

The Rx controller 409 designates the input position of the coordinate indicating device. For example, the Rx controller 409 generates an Rx signal for coordinate indication and outputs the Rx signal to the signal modulator/demodulator 410. The Rx signal is modulated by the signal modulator/demodulator 410 and is output to the coil 401, and the output Rx signal is input to the coordinate measuring device 100.

Figure 5:
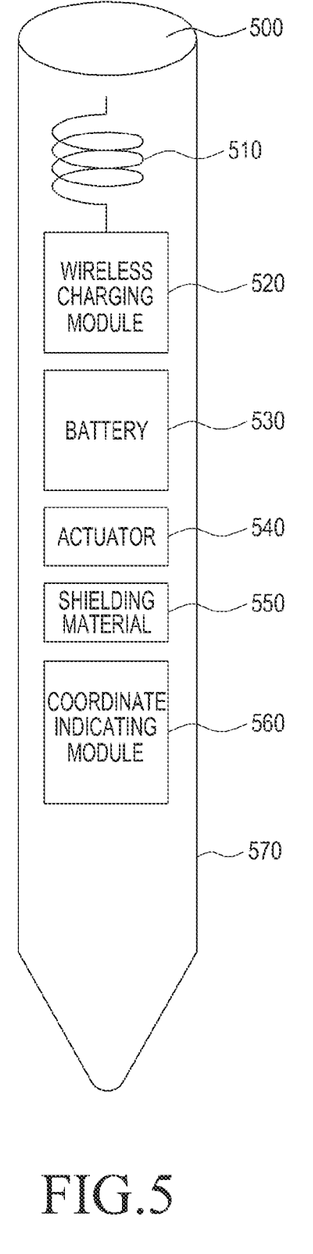
FIG. 5 is a conceptual diagram illustrating a coordinate indicating device according to another embodiment of the present invention.

FIG. 5 is a conceptual diagram illustrating a coordinate indicating device 500 according to another embodiment of the present invention.

Referring to FIG. 5, the coordinate indicating device 500 includes a coil 510, a wireless charging module 520, a battery 530, an actuator 540, shielding material 550, a coordinate indicating module 560, and a ground means 570.

The coordinate indicating module 560 is disposed adjacent to the pen tip of the coordinate indicating device 500. The coordinate indicating module 560 may be configured to designate a particular point on the coordinate measuring device 100. The coordinate indicating module 560 designates a particular point on the coordinate measuring device 100, for example, based on an EMR scheme. In this case, the coordinate indicating module 560 includes a coil and a capacitor.

The shielding material 550 is disposed above the coordinate indicating module 560. The shielding material 550 includes at least one of Fe—Ni, Fe—Si, and Fe—Co. The shielding material 550 shields the coordinate indicating module 560 from the other components 510 through 540.

The wireless charging module 520 controls wireless charging and further includes an impedance matching circuit.

Figure 6:
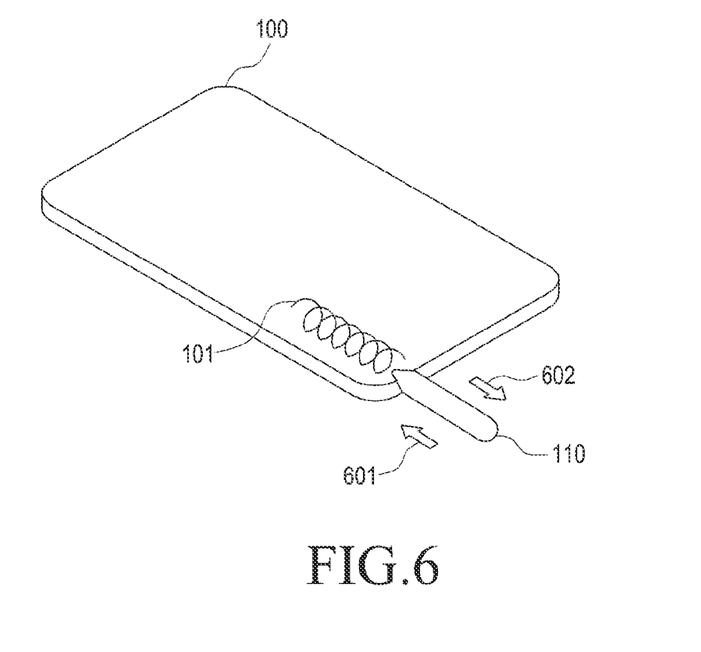
FIG. 6 is a conceptual diagram illustrating a wireless charging scheme according to an embodiment of the present invention.

FIG. 6 is a conceptual diagram illustrating a wireless charging scheme according to an embodiment of the present invention.

The coordinate measuring device 100 includes a coil 101 for wirelessly transmitting drive power. The coordinate measuring device 100 includes an insertion hole which passes through a center of the coil 101.

The coordinate indicating device 110 moves along an inserting direction 601 to be inserted into the insertion hole of the coordinate measuring device 100 or moves along a counter-inserting direction 602 to be separated from the coordinate measuring device 100. When the coordinate indicating device 110 is inserted, the coil 101 of the coordinate measuring device 100 and the coil of the coordinate indicating device 110 are arranged in a form in which the drive power is wirelessly transmitted at the maximum efficiency.

Thus, the coordinate indicating device 110 wirelessly receives drive power while being disposed adjacent to the coordinate measuring device 100, and when inserted into the insertion hole of the coordinate measuring device 100, wirelessly receives the drive power at the maximum efficiency.

Figure 7:
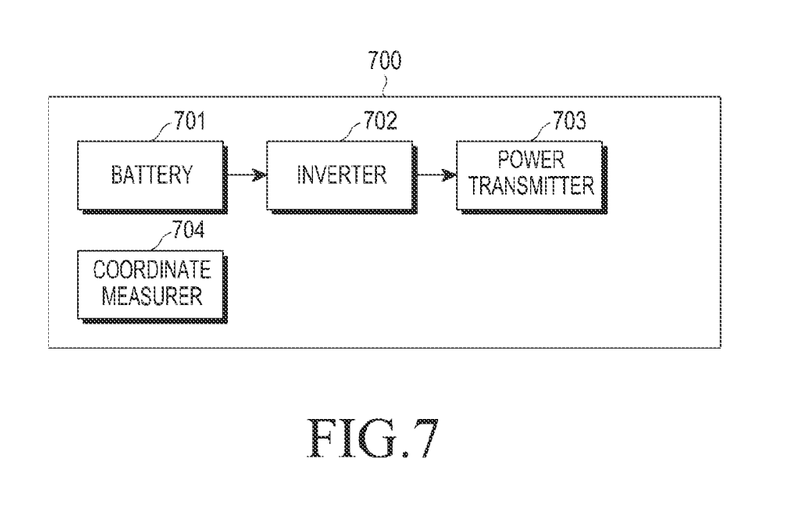
FIG. 7 is a block diagram illustrating a coordinate measuring device according to an embodiment of the present invention.

FIG. 7 is a block diagram illustrating a coordinate measuring device 700 according to an embodiment of the present invention.

Referring to FIG. 7, the coordinate measuring device 700 includes a battery 701, an inverter 702, a power transmitter 703, and a coordinate measurer 704.

The battery 701 stores drive power required for driving the coordinate measuring device 700. The battery 701 also provides drive power required for driving the coordinate measuring device 700.

The inverter 702 inverts drive power of a DC waveform provided from the battery 701 into drive power of an AC waveform.

The power transmitter 703 wirelessly transmits the drive power to the coordinate indicating device based on one of the induction scheme, the resonance scheme, and the E-field coupling scheme. The power transmitter 703 may include, for example, a coil.

The coordinate measurer 704 measures the input position of the coordinate indicating device based on an Rx signal input from the coordinate indicating device. For example, the coordinate measurer 704 includes at least one position-measuring loop coil. The at least one loop coil receives Rx signals having strengths that differ according to distances from the coordinate indicating device. The coordinate measurer 704 measures the input position of the coordinate measuring device based on the strengths of the Rx signals input to the respective loop coils. For example, the coordinate measurer 704 determines a point corresponding to a loop coil to which the Rx signal of the highest strength is input as an input point. The coordinate measurer 704 may also measure the input position by interpolating the strengths of the Rx signals input to the respective loop coils.

Figure 8:
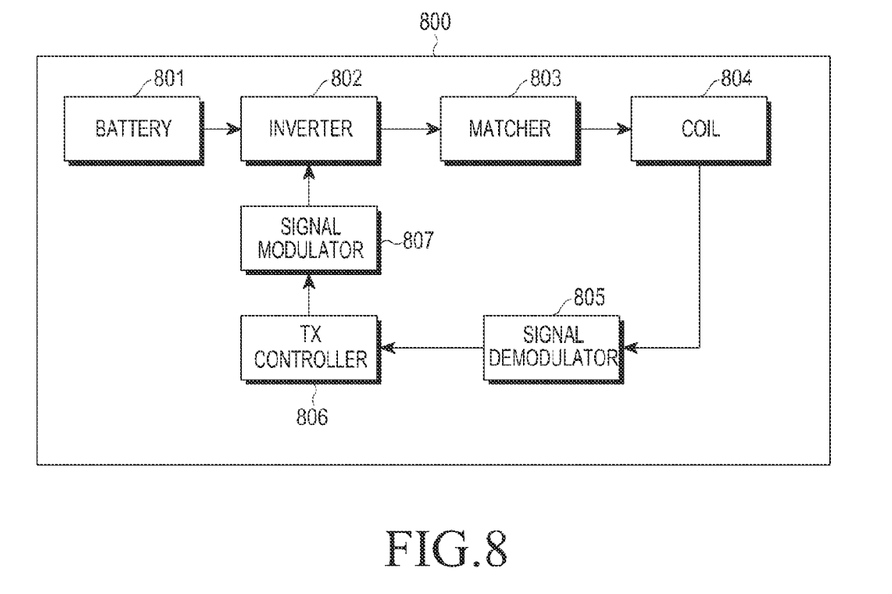
FIG. 8 is a block diagram illustrating a coordinate measuring device according to another embodiment of the present invention.

FIG. 8 is a block diagram illustrating a coordinate measuring device 800 according to another embodiment of the present invention.

Referring to FIG. 8, the coordinate measuring device 800 includes a battery 801, an inverter 802, a matcher 803, a coil 804, a signal demodulator 805, a transmission (Tx) controller 806, and a signal modulator 807. Among the components of FIG. 8, the same components as those of FIG. 7 will not be described repetitively.

The matcher 803 performs impedance matching. As described above, the efficiency of charging may be changed as the coordinate indicating device approaches the fully-charged state. Thus, the impedance may be changed, and the matcher 803 performs impedance matching to offset the impedance change.

The coil 804 transmits the drive power to the coordinate indicating device.

The signal demodulator 805 demodulates an Rx signal input from the coordinate indicating device, and the Tx controller 806 measures the input position of the coordinate indicating device based on the demodulated Rx signal.

The Tx controller 806 generates a signal which is to be output to the coordinate indicating device, for example, an actuator control signal. The signal modulator 807 modulates a signal output from the Tx controller 806 to output the modulated signal to the inverter 802.

Figure 9:
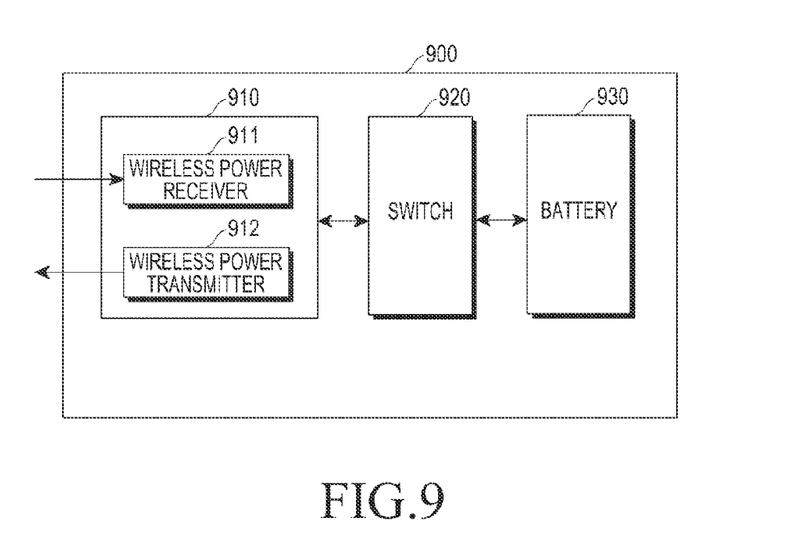
FIG. 9 is a block diagram illustrating a coordinate measuring device according to another embodiment of the present invention.

FIG. 9 is a block diagram illustrating a coordinate measuring device 900 according to an embodiment of the present invention. In particular, in FIG. 9, a description will be focused on a structure for transmitting and receiving drive power in the coordinate measuring device. The coordinate measuring device according to an embodiment illustrated in FIG. 9 not only transmits the drive power to the coordinate indicating device, but also wirelessly receives drive power required for driving the coordinate measuring device from a power providing device (not illustrated).

The coordinate measuring device 900 includes a wireless power transmitter/receiver 910, a switch 920, and a battery 930. The wireless power transmitter/receiver 910 includes a wireless power receiver 911 and a wireless power transmitter 912.

The wireless power receiver 911 wirelessly receives drive power required for driving the coordinate measuring device 900 from the power providing device (not illustrated). Moreover, the wireless power transmitter 912 wirelessly transmits the drive power to the coordinate indicating device.

The switch 920 connects the battery 930 with the wireless power receiver 911 during a first period. During the first period, the wireless power received from the wireless power receiver 911 is stored in the battery 930, and the coordinate measuring device 900 performs charging. During a second period, the switch 920 connects the battery 930 with the wireless power transmitter 912. During the second period, the wireless power transmitter 912 wirelessly transmits drive power to the coordinate indicating device, and the coordinate indicating device performs charging. The wireless power receiver 911 and the wireless power transmitter 912 may also be connected to the battery 930 at the same time. That is, the coordinate measuring device may perform charging and drive power transmission at the same time.

While certain embodiments of the present invention have been shown and described, it is to be appreciated that those skilled in the art can modify the embodiments in various ways without departing from the scope and spirit of the present invention. Therefore, various modifications may be possible without departing from the subject matter of the present invention, and the modified embodiments should not be construed individually from the technical spirit or prospect of the present invention.

What is claimed is:

1. A coordinate indicating device for inputting coordinates to a coordinate measuring device, the coordinate indicating device comprising:
   a power receiver for wirelessly receiving drive power from the coordinate measuring device, wherein the coordinate measuring device measures a position of the coordinate indicating device;
   a rectifier for rectifying the wirelessly received drive power into Direct Current (DC) drive power;
   a battery for storing the rectified drive power;
   a coordinate indicator for transmitting a signal for indicating a coordinate on the coordinate measuring device; and
   a shielding portion, disposed adjacent to the coordinate indicator, for shielding the coordinate indicator from the rectifier, the battery, and the power receiver,
   wherein the shielding portion is not disposed adjacent to the power receiver.

2. The coordinate indicating device of claim 1, wherein the coordinate indicating device is in the form of a pen, and wherein the coordinate indicator is disposed in a tip portion of the pen and the shielding portion is disposed above the coordinate indicator.

3. The coordinate indicating device of claim 1, wherein the shielding portion comprises at least one of Fe—Ni, Fe—Si, and Fe—Co.

4. The coordinate indicating device of claim 1, wherein the power receiver wirelessly receives the drive power based on one of an induction scheme, a resonance scheme, and an electric-field (E-field) coupling scheme.

5. The coordinate indicating device of claim 1, wherein the power receiver comprises a coil having a preset inductance.

6. The coordinate indicating device of claim 1, wherein the coordinate indicator comprises a coil and a passive element and indicates coordinates in a particular point of the coordinate measuring device based on an Electro Magnetic Resonance (EMR) scheme.

7. The coordinate indicating device of claim 1, wherein the coordinate indicating device is inserted into an insertion hole of the coordinate measuring device, and when the coordinate indicating device is inserted into the coordinate measuring device, the power receiver wirelessly receives the drive power from the coordinate measuring device.

8. The coordinate indicating device of claim 1, further comprising:
   an actuator for outputting at least one of preset vibration, frictional force, and electrostatic force, based on relative positions of the coordinate measuring device and the coordinate indicating device by using the rectified drive power provided from the battery.

9. The coordinate indicating device of claim 8, wherein the actuator comprises at least one of a vibration motor, a linear motor, piezoelectric material, and Electro-Active Polymer (EAP).

* * * * *